UNITED STATES PATENT OFFICE.

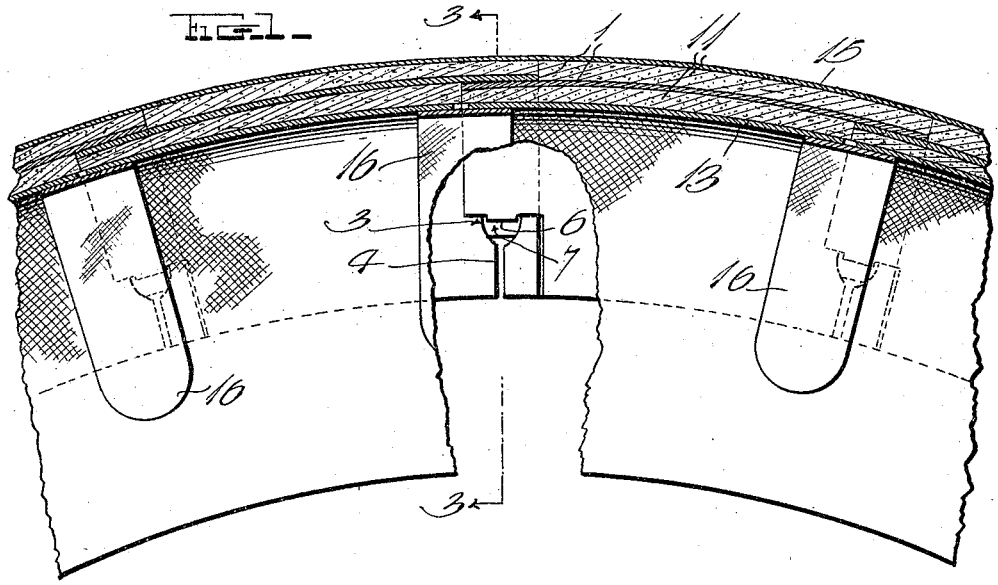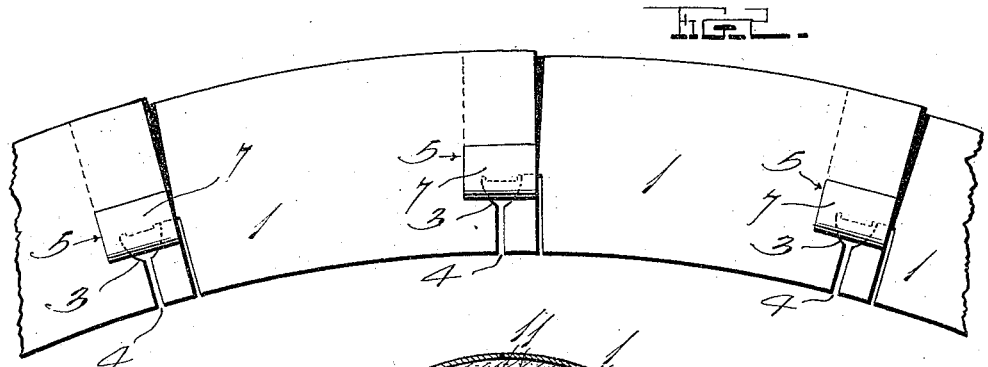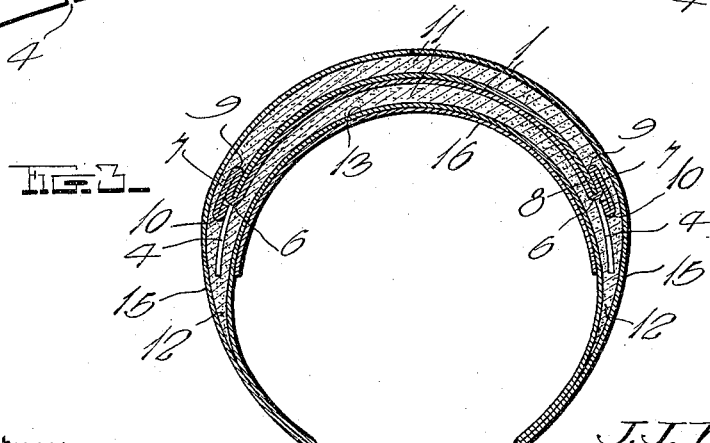

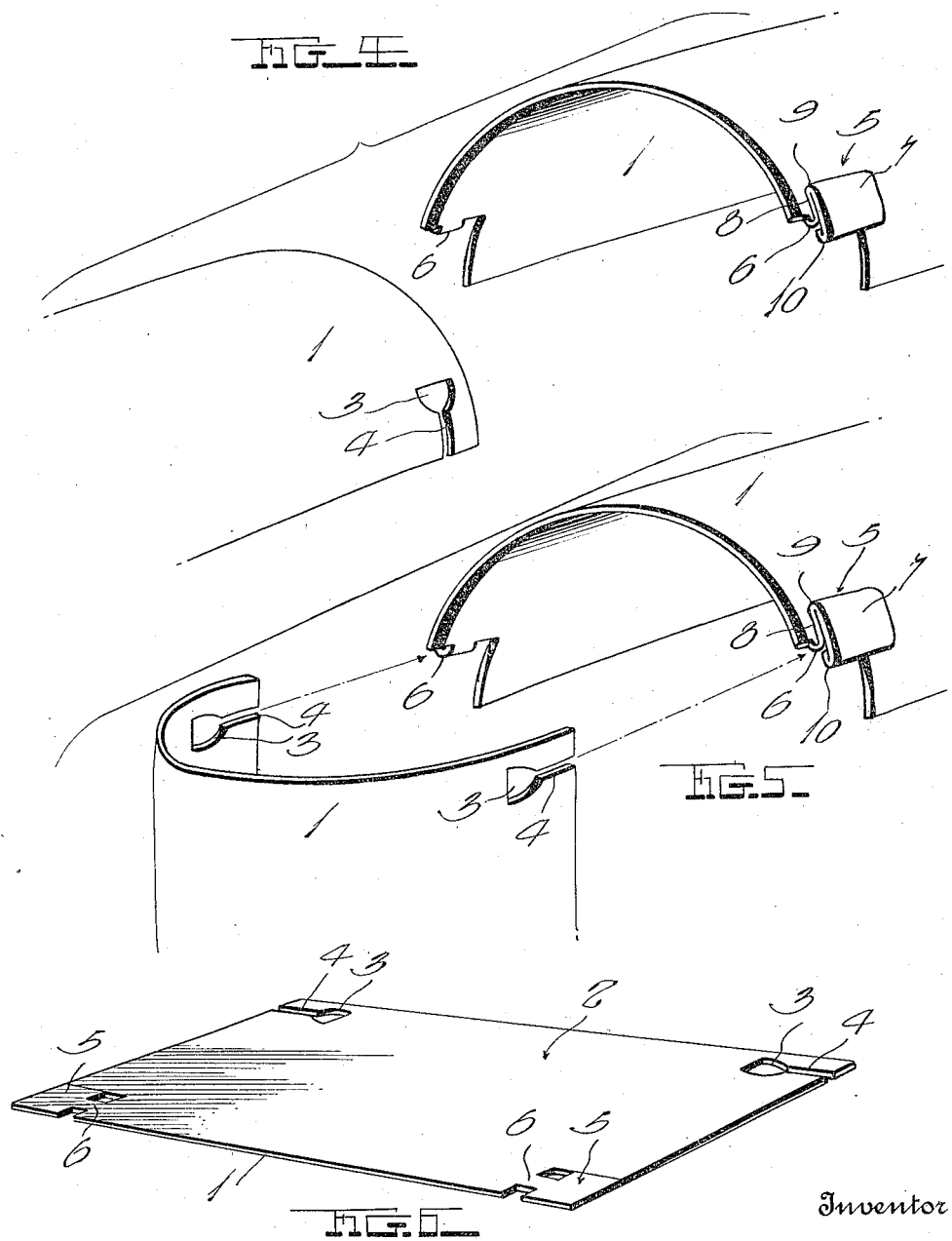

JOHN JOSEPH MOORE, OF SOUTH CHARLESTON, OHIO.

TIRE-LINER.

1,298,765.  Specification of Letters Patent.  Patented Apr. 1, 1919.

Application filed February 18, 1918. Serial No. 217,850.

*To all whom it may concern:*

Be it known that I, JOHN J. MOORE, a citizen of the United States, residing at South Charleston, in the county of Clark and State of Ohio, have invented certain new and useful Improvements in Tire-Liners; and I do declare the following to be a full, clear, and exact description of the invention, such as will enable others skilled in the art to which it appertains to make and use the same.

One object of the present invention is to provide a simply constructed and inexpensive, yet a highly efficient and durable liner to be positioned between the inner tubes and casings of automobile and other vehicle tires to prevent puncturing of said tubes.

A further object is to provide novel connecting means between the several metallic sections of the liner, whereby free yielding is permitted so that the resiliency of the tire is not impaired.

A still further object is to so connect the several sections of the device as to render it impossible to separate them without first positioning the adjacent sections at an angle to each other.

Yet another object is to provide a covering of asbestos or other suitable heat resisting material having pliability, and to provide a fabric lining extending over and secured to the entire surface of the tire liner and provided with elastic portions disposed opposite the joints between the several sections so that pinching of the tube will be prevented and at the same time the necessary yielding of the device will be permitted.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a circumferential sectional view of the improved liner with part of the fabric lining thereof broken away;

Fig. 2 is a side elevation of the liner with the outer covering removed;

Fig. 3 is a transverse section on the plane of the line 3—3 of Fig. 1;

Fig. 4 is a perspective view of two of the metallic sections in juxtaposition;

Fig. 5 is a similar view showing the manner in which these sections must be angled in order to connect them; and Fig. 6 is a perspective view of one of the blanks from which the sections of the liner are constructed.

In the drawings above briefly described, the numerals 1 designate a plurality of arched sheet metal sections coöperating in forming a complete channel-shaped armor to be interposed between the casing and inner tube of the tire or to be incorporated in the casing structure if desired. One end of each section 1 overlaps the other end of the next adjacent section and novel connecting means are employed between the several sections.

Each of the arched sections 1 is formed of a flat sheet metal plate 2 as illustrated in Fig. 6, this plate being stamped and bent into shape to form the sections. The corners of the plate 2 located at one end of each section 1 are formed with substantially triangular openings 3 and slots 4 leading from these openings through the edges of the plate, said slots being of less width than said openings. The other corners of the plate 2 are stamped to form T-shaped connecting members 5 whose necks or shanks 6 are bent laterally outward for reception in the openings 3, the head 7 of each connecting member being bent laterally in one direction as seen at 8 and then folded upon itself at 9, the free edge of this folded portion being preferably bent inwardly upon itself at 10. By this construction, the device may be easily and inexpensively manufactured, yet the connection 5 will be efficient and durable.

In order to assemble the several sections 1, it is necessary to locate them at angles to each other as shown in Fig. 5, whereupon the necks 6 may be inserted into the openings 3 through the slots 4. When the sections are then moved into alinement, the necks are positioned transversely of said slots and thus the sections cannot be disconnected until again angled.

The inner and outer sides of the sections 1 are provided with coverings 11 of comparatively soft and pliable heat-resisting material such as asbestos, the edge portions of these layers being extended beyond the edges of the metallic sections 1 and decreased in thickness as shown at 12 in Fig. 3. The covering 11 is formed of sections as shown in Fig. 1 and in order to prevent pinching of the tube between the inner sections of such covering and to prevent the latter from breaking down under wear, a lining 13 of canvas or other suitable material is provided. The edges of the lining 13 extend beyond the edges 12 of the covering 11 and are folded outwardly upon themselves so that they overlap and completely cover the outer layer of such covering as seen at 15. Opposite the joints between the several sections of the liner, elastic areas 16 are secured to the inner side of the lining 13 or otherwise incorporated therewith to permit free yielding at the joints and yet protect the tube. The entire lining 13 is secured in place by some adhesive substance. Opposite each area on strip 16, the lining 13 is shown slit transversely, but this is not essential.

The device is either interposed between the inner tube and the casing of the tire or is embodied in the casing while constructing the latter, but in most cases I prefer to employ the first named arrangement. When applied in either manner however the device will prevent punctures and blow-outs and will in a number of ways increase the efficiency and mileage of the pneumatic tire. The construction is simple and inexpensive, yet excellent results are obtained; and since probably the best form of my invention is illustrated and described, I prefer to employ this construction. I wish it understood that within the scope of the invention as claimed, numerous minor changes may well be made.

I claim:

1. A tire liner and inner tube protector comprising a pair of arched sections disposed adjacent the tread of the tire and overlapping at one end, the outer end of the one section having slots and the inner end of the other section having lateral projections receivable in said slots when the two sections are relatively moved to position their longitudinal axes at an angle, said projections lying transversely of said slots when the sections are again moved into alinement.

2. A tire liner comprising a pair of arched sections overlapping at one end, the outer end of the one section having a pair of openings near its edges and having a pair of narrow slots leading from said openings through said edges, the inner end of the other section having near its edges a pair of flat lateral necks provided on their outer ends with heads, said necks being insertible into said openings through said slot when the two sections are suitably angled and lying transversely of said slots and in said openings when said sections are moved into alinement.

3. A structure as specified in claim 2, said necks and heads being formed by stamping the corners of their respective section into T-shape, bending the T laterally outward and folding its enlarged outer end laterally in one direction and then folding it upon itself in the other direction.

4. A tire liner comprising a plurality of one piece channel-shaped metal sections extending circumferentially and loosely connected at their ends, layers of soft pliable material on the outer and inner sides of said sections, said layers extending beyond the edges of said sections and having their projecting portions reduced in thickness, a fabric lining on the inner side of the innermost of said layers and extending beyond the thinned edges thereof, the edges of said lining being folded outwardly upon themselves and upon the outermost of said layers, and transverse areas of elastic material incorporated with said fabric lining and located opposite the joints between said sections.

5. A tire liner comprising a plurality of one piece channel shaped metal sections extending circumferentially and loosely connected at their ends, layers of soft pliable material on the outer and inner sides of said sections, a fabric lining on the inner side of the innermost of said layers, and transverse areas of elastic material incorporated with said fabric lining and located opposite the joints between said sections.

6. A tire liner comprising a pair of arched sections overlapping at one end, the outer end of the one section having a pair of openings near its edges and having a pair of narrow slots leading from said openings through said edges, the inner end of the other section having near its edges a pair of flat lateral necks, said necks being insertible into said openings through said slots when the two sections are suitably angled, and lying transversely of said slots and in said openings when said sections are moved into alinement.

In testimony whereof I have hereunto set my hand in the presence of two subscribing witnesses.

JOHN JOSEPH MOORE.

Witnesses:
 WARREN M. ARTHUR,
 CARL HONICEK.

Copies of this patent may be obtained for five cents each, by addressing the "Commissioner of Patents, Washington, D. C."